(12) United States Patent
Guillemette et al.

(10) Patent No.: US 10,406,773 B2
(45) Date of Patent: Sep. 10, 2019

(54) METHOD OF MULTI-DEFLECTOR BALANCING AND STRENGTHENING

(71) Applicant: GUILL TOOL & ENGINEERING, CO., West Warwick, RI (US)

(72) Inventors: Richard Guillemette, West Warwick, RI (US); Robert Peters, West Warwik, RI (US)

(73) Assignee: GUILL TOOL & ENGINEERING CO., INC., West Warwick, RI (US)

( * ) Notice: Subject to any disclaimer, the term of this patent is extended or adjusted under 35 U.S.C. 154(b) by 919 days.

(21) Appl. No.: 14/627,243

(22) Filed: Feb. 20, 2015

(65) Prior Publication Data

US 2015/0298381 A1    Oct. 22, 2015

Related U.S. Application Data

(60) Provisional application No. 61/942,522, filed on Feb. 20, 2014.

(51) Int. Cl.
| | | |
|---|---|---|
| *B32B 1/08* | (2006.01) | |
| *B29C 48/30* | (2019.01) | |
| *B29C 48/335* | (2019.01) | |
| *B29C 48/09* | (2019.01) | |
| *B29C 48/21* | (2019.01) | |
| *B29C 48/19* | (2019.01) | |

(52) U.S. Cl.
CPC .............. *B32B 1/08* (2013.01); *B29C 48/30* (2019.02); *B29C 48/335* (2019.02); *B29C 48/09* (2019.02); *B29C 48/19* (2019.02); *B29C 48/21* (2019.02); *B32B 2597/00* (2013.01)

(58) Field of Classification Search
CPC ....... B32B 1/08; B32B 2597/00; B29C 47/26; B29C 47/062; B29C 47/0023; B29C 47/065; B29C 47/261; B29C 47/263; B29C 47/265; B29C 47/268; B29C 48/335; B29C 48/30; B29C 48/19; B29C 48/21; B29C 48/09
See application file for complete search history.

(56) References Cited

U.S. PATENT DOCUMENTS

| | | | | |
|---|---|---|---|---|
| 3,266,092 A | * | 8/1966 | Corbett | .................. B29C 48/30 425/462 |
| 3,308,508 A | * | 3/1967 | Schrenk | .................... B22C 9/06 425/133.1 |
| 3,337,914 A | * | 8/1967 | Corbett | ............... B29C 47/0023 118/405 |
| 3,419,938 A | * | 1/1969 | Sonia | .................. B29C 47/0023 425/133.1 |
| 3,558,755 A | * | 1/1971 | Laben | ................. B29C 47/0014 264/171.27 |
| 3,801,254 A | * | 4/1974 | Godtner | .............. B29C 47/0023 264/515 |

(Continued)

*Primary Examiner* — Jeffrey M Wollschlager
(74) *Attorney, Agent, or Firm* — Ziegler IP Law Group, LLC

(57) ABSTRACT

The disclosed embodiments relate to extrusion systems and involves a method to promote self-balancing of flow velocity while enhancing the strength of the end product by off-setting seams. This invention focuses on using a system of more than one deflector to produce multiple rings which are then quickly merged to produce a more quickly balanced ring.

6 Claims, 4 Drawing Sheets

(56) References Cited

U.S. PATENT DOCUMENTS

| | | | | |
|---|---|---|---|---|
| 4,042,661 A * | 8/1977 | Cook | B29C 47/0023 | 264/171.29 |
| 4,063,865 A * | 12/1977 | Becker | B29C 47/20 | 425/380 |
| 4,125,585 A * | 11/1978 | Rosenbaum | B29C 47/0023 | 264/171.26 |
| 4,723,902 A * | 2/1988 | Erickson | B29C 47/0023 | 264/171.26 |
| 4,806,289 A * | 2/1989 | Laursen | B29C 47/0023 | 264/1.29 |
| 5,206,032 A * | 4/1993 | Bock | B29C 47/0023 | 425/131.1 |
| 5,284,687 A * | 2/1994 | Blemberg | B29C 47/0026 | 428/172 |
| 5,538,411 A * | 7/1996 | Gates | B29C 47/0023 | 264/171.27 |
| 5,980,226 A | 11/1999 | Guillemette | | |
| 6,000,926 A * | 12/1999 | Schirmer | B29C 47/0023 | 425/133.1 |
| 6,077,062 A * | 6/2000 | Guillemette | B29C 47/0023 | 425/113 |
| 6,135,750 A | 10/2000 | Guillemette | | |
| 6,190,152 B1 * | 2/2001 | Cree | B29C 47/0023 | 425/133.1 |
| 6,343,919 B1 * | 2/2002 | Rodriguez | B29C 47/0023 | 425/133.1 |
| 6,345,972 B1 | 2/2002 | Guillemette | | |
| 6,503,438 B2 * | 1/2003 | Beaumont | B29C 45/2701 | 264/297.1 |
| 6,638,462 B2 * | 10/2003 | Davidson | B29C 47/065 | 264/171.26 |
| 6,692,804 B1 * | 2/2004 | Guillemette | B29C 47/0023 | 138/137 |
| 7,097,441 B2 * | 8/2006 | Sagar | B29C 47/0023 | 425/133.1 |
| 2002/0114858 A1 * | 8/2002 | Castillo | B29C 47/0023 | 425/133.1 |
| 2003/0020204 A1 * | 1/2003 | Davidson | B29C 47/065 | 264/173.11 |
| 2004/0070105 A1 * | 4/2004 | Rasmussen | A23G 3/2015 | 264/171.26 |
| 2005/0017387 A1 * | 1/2005 | Harris | B29C 47/0874 | 264/40.1 |
| 2006/0275523 A1 * | 12/2006 | Marzano | B29C 47/0023 | 425/133.1 |
| 2007/0187856 A1 * | 8/2007 | Kitauji | B29C 47/0023 | 264/40.6 |
| 2009/0088711 A1 * | 4/2009 | Shelley | A61M 25/0045 | 604/328 |
| 2009/0288728 A1 * | 11/2009 | Sumi | B32B 1/08 | 138/137 |
| 2010/0055367 A1 * | 3/2010 | Ohigawa | B32B 1/08 | 428/36.91 |
| 2010/0215879 A1 * | 8/2010 | Dooley | B29C 47/0023 | 428/35.7 |
| 2013/0344271 A1 * | 12/2013 | Guillemette | B29D 23/00 | 428/36.91 |

\* cited by examiner

METHOD OF MULTI-DEFLECTOR BALANCING AND STRENGTHENING

BACKGROUND

Extrusion of tubular plastic products faces a challenge of creating an annular shape from a stream of molten plastic free of seam (weld line) defects. Components of extrusion dies designed to convert flow from a stream or streams into an annular ring are called deflectors. When deflectors produce these rings it is often difficult to produce a ring with even velocity around the ring. If a stream was to flow indefinitely in an annular ring, velocities would eventually even out, however, this takes time and length in the flow channel for this to occur. In an extrusion die, it is often a goal to minimize residence time of plastic in the die as well as the size of the die in order to minimize any material degradation as well as the cost of manufacture. While forming the desired tubular shape prior to extrusion, the passageways in the extrusion die are designed so that there is an even flow velocity around the annular shape to promote an even thickness wall in the product. To create a complete annular ring a stream of material often merges with itself or another stream of material as the material progresses around an annular shape. Seams, which can be weak spots in the product, form at the locations where material merges.

SUMMARY

The aspects of the disclosed embodiments involve a method to promote self balancing of flow velocity while enhancing the strength of the end product by off-setting seams.

This invention focuses on using a system of more than one deflector to produce multiple rings which are then quickly merged to produce a more quickly balanced ring.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the present disclosure, and together with the general description given above and the detailed description given below, serve to explain the principles of the present disclosure. As shown throughout the drawings, like reference numerals designate like or corresponding parts.

DETAILED DESCRIPTION OF THE DISCLOSED EMBODIMENTS

The present disclosure is generally directed towards methods for promoting self balancing of flow velocity while enhancing the strength of the end product by off-setting seams. As will be understood, the various diagrams, flow charts and scenarios described herein are only examples, and there are many other scenarios to which the present disclosure will apply.

Figure 1:
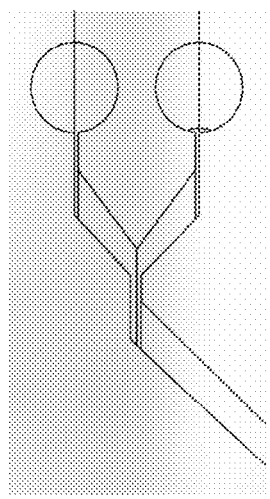
FIG. 1 depicts a cross section, through a generic extrusion head, in which rings produced from two deflectors are merged into one before proceeding forward.
Figure 2:
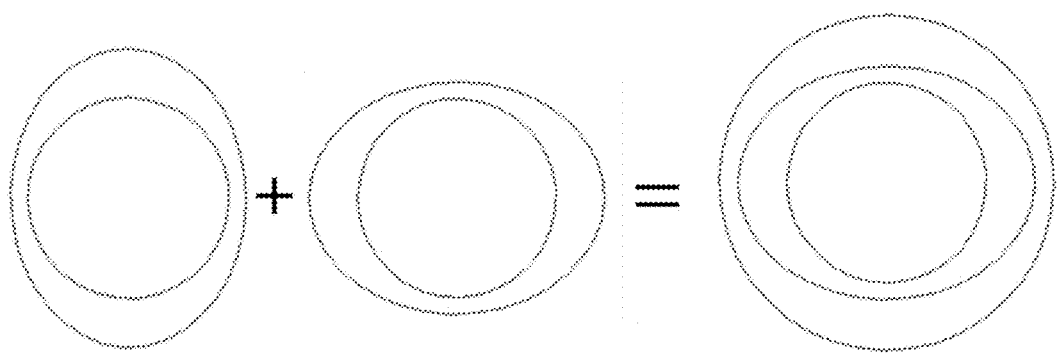
FIG. 2 depicts a balanced ring formed by two rings in which areas of high flow match up with areas of low flow.

A generic extrusion head, such as illustrated in FIG. 1, shows a cross section, in which rings produced from two deflectors are merged into one before proceeding forward. In an extrusion system, when two such rings or layers are merging, each layer could have areas of high velocity and areas of low velocity. Ideally to produce a balanced ring, areas of high velocity in one layer would align with areas of low velocity in the other ring so as to form a flow of equal velocity throughout the ring or layer. In order to accomplish this, identical deflectors may be rotationally offset so that a section of one deflector corresponding to a high spot in its respective ring may be merged with a low spot produced by a different section of the other deflector. FIG. 2, illustrates such a balanced ring formed by two rings in which areas of high flow match up with areas of low flow. This process is not limited to just two rings, and this method could be extended to produce any amount of ring layers in the final product.

Beyond the matching of high and low velocities, when two or more annular rings of flowing material merge into a singular ring, there is a balancing effect on the velocities inside the rings. Differences in velocities in a ring are a function of both the resistance to flow the material has experienced as well as a function of downstream resistance. Higher flow velocities incur more resistance which acts to smooth out the velocities going forward. If a merged ring has a high velocity region, this zone flow is somewhat suppressed because the rings upstream experience the forces translated from the high velocity region. This means if one ring would otherwise be perfectly balanced but another ring has a high spot, a low spot will form in the otherwise balanced ring where it anticipates meeting up with the high spot. This effect helps to create a more balanced merged stream. An even pinch or 'secondary dam' could be placed after the newly merged ring in order to help rapidly eliminate any remaining imbalance.

Rings of material produced in a rotationally offset manner can enhance the strength of the product by off-setting seams.

Figure 3:
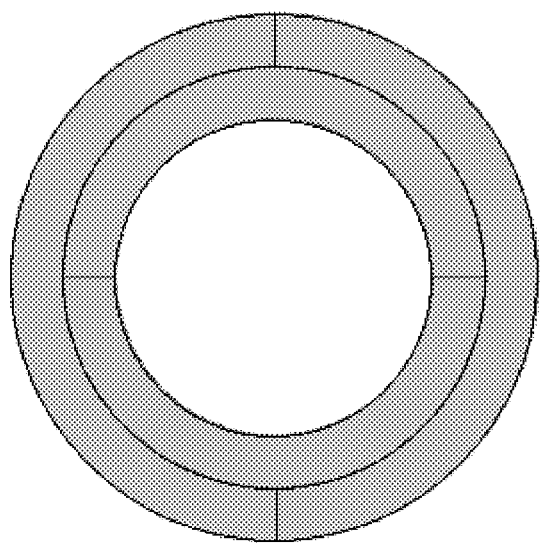
FIG. 3 depicts offset seams of two merged rings of material.

Off-set seams, such as depicted in FIG. 3, will increase the strength by covering weaker sections of a product with a stronger section. Multiple layers of material could also enhance strength by isolating crack propagation in individual layers.

Figure 4:
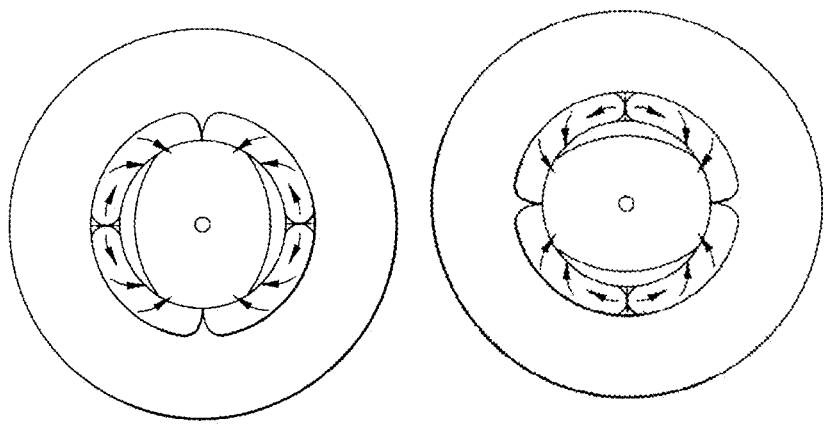
FIG. 4 demonstrates two rotationally offset deflectors whose combined output would have off-setting seams in the manner seen above.

FIG. 4 demonstrates two rotationally offset deflectors whose combined output would have off-setting seams in the manner seen above.

Examples and explanations have so far involved two deflectors/rings of materials merging. However, many deflectors could be used in various arrays in order to quickly join outputs.

Figure 5:
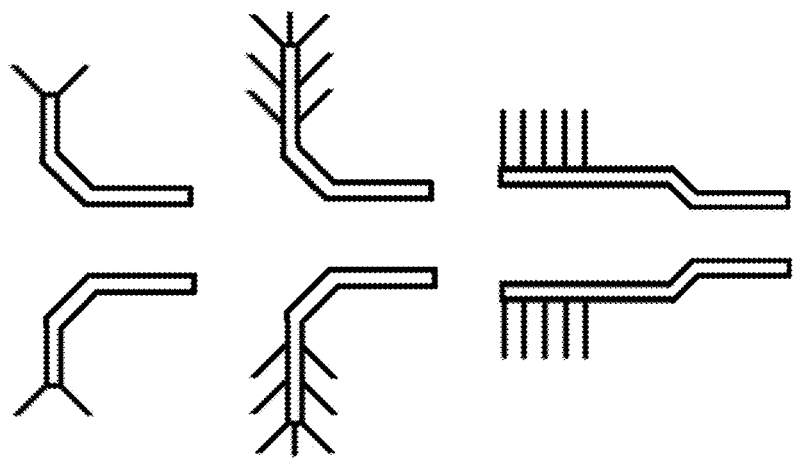
FIG. 5 illustrates some example schematics of how deflector outputs could quickly join together with lines representing a merging layer.

FIG. 5 demonstrates some example schematics of how deflector outputs could quickly join together with lines representing a merging layer. The combined layers would then proceed through the rest of the extrusion die.

Methods exist in which multiple layers of a material are merged in order to increase strength. What makes this method unique is that after initial deflection there is only minimal flow length before merging with another layer. Instead of attempting to make each layer perfectly balanced by means of long flow lengths and/or compression prior to being merged, this method focuses on achieving a multi layered product which is rapidly balanced by cumulative additions of material derived from offset deflectors in a relatively compact design. This method essentially utilizes multiple sub deflectors to function as a more robust singular deflector. Depending on the arrangement of a deflector system, one or more divider plates such as the one shown in FIG. 1 may be present to help form and merge the individual sub deflectors in the deflector system.

Multi-deflector balancing will also be more versatile in its ability to produce a balanced flow with a variety of materials and flow rates. A single deflector is generally designed to create a balanced flow for a specific material at a specific flow rate and temperature. Deviating from the ideal processing conditions and/or material could potentially result in an imbalanced flow. Offset deflectors will serve as a more robust design that will withstand more changes in processing conditions. Products created via a multi-deflector approach will have an enhanced burst strength as this method serves to offset any systematic imperfections in the product, thus dispersing any weakness throughout the profile. Specifically, products which contain gels or other agglomerations of plastic, would greatly benefit from having these imperfections more evenly distributed across the product. These enhancements could benefit extruded products such as medical tubes and irrigation tubes.

Some example deflectors which could be used in this method include spiral, bow-tie, circumferential, and/or wrapping deflectors. While it is likely the same kind of defectors will be used together, it would be possible to mix and match different deflector styles together.

Figure 6A:
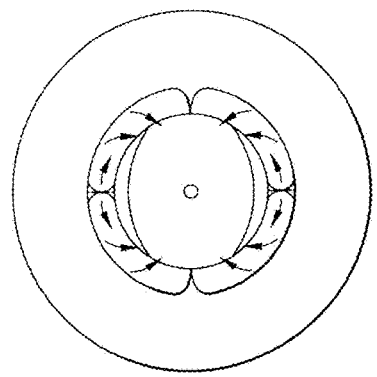
FIG. 6a. Cross-section of a bowtie deflector.
Figure 6B:
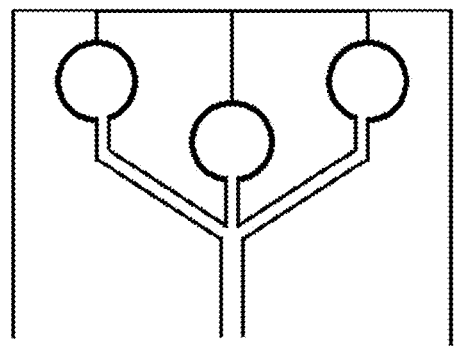
FIG. 6b. Three Bowtie rings balanced to even flow.

So-called 'bow-tie' deflectors are known in the art and include for example those found in U.S. Pat. Nos. 6,345,972, 6,077,062, and 5,980,226. These deflectors rely on material flowing in a groove(s) while bleeding over an edge or 'dam' radially inward to form a balanced tube. The dam can be modified by changing the width and distance from the wall to the edge which determines how easily a fluid will spill over. By changing these characteristics a more balanced flow can be achieved, see for Example FIGS. 6(a) and 6(b). These deflectors can take one or more input streams and the grooves can be formed such that the streams of material can be formed into an annular ring by flowing in one or both directions around the central axis before merging end to end to create a complete ring.

Figure 7:
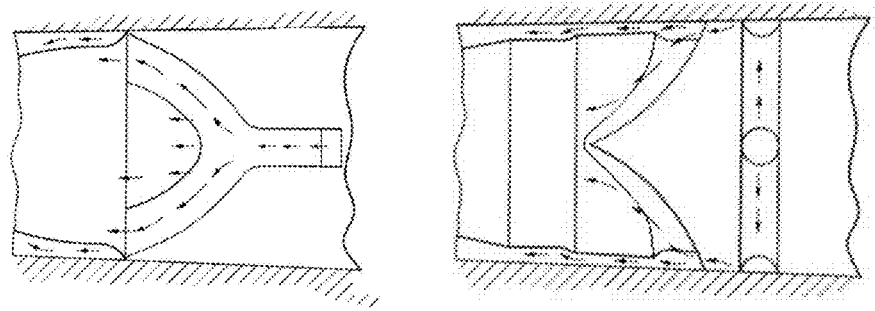
FIG. 7. Different angles of circumferential deflectors.
Figure 8:
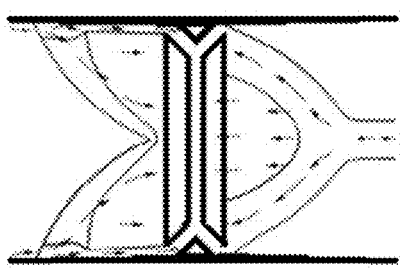
FIG. 8 illustrates two offset circumferential deflectors with merging outputs.

The 'circumferential' deflectors are known in the art such as for example those found in U.S. Pat. No. 6,135,750. These deflectors rely on material flowing in a groove(s) while bleeding over an edge or 'dam' in the direction of the flow to form a balanced tube. The dam can be modified, such as those depicted in FIGS. 7 and 8, by changing the width and distance from the wall to the edge which determines how easily a fluid will spill over. By changing these characteristics a balanced flow can be achieved.

Figure 9:
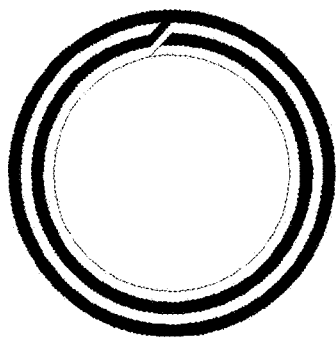
FIG. 9. An Example of a product made by a wrapping deflector which shows the wrapping of layers.
Figure 10:
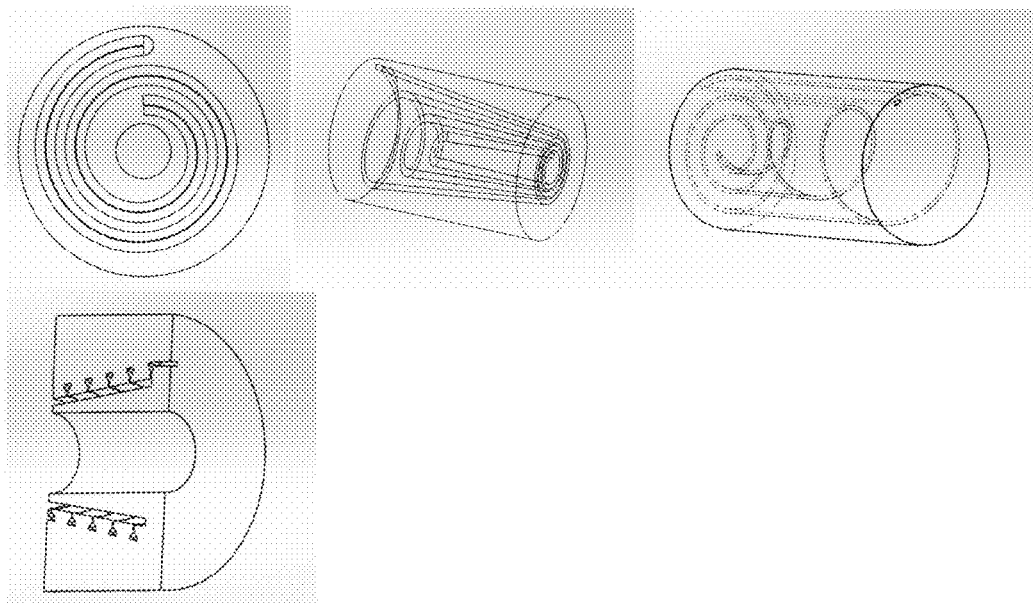
FIG. 10. Examples of wrapping deflectors.

Another embodiment of the invention relates to a die containing 'wrapping' deflectors which will act to wrap a stream into a tubular shape. These deflectors may rely on material flowing in a groove(s) while bleeding through a slit or 'dam' to wrap material any number of times in a tubular shape. The dam can be modified by changing the length and/or thickness which determines how easily a fluid will flow through, as in FIG. 9. The size of the groove can also be modified. By changing these characteristics a more balanced flow can be achieved. In general, the deflectors work by making flow in the wrapping direction less torturous than the direction of extrusion. Multiple streams could also be inter-wrapped within each other, such as in FIG. 10. These deflectors essentially roll up a stream into a tube as opposed to creating a ring through end to end merging.

Thus, while there have been shown, described and pointed out, fundamental novel features of the invention as applied to the exemplary embodiments thereof, it will be understood that various omissions and substitutions and changes in the form and details of devices and methods illustrated, and in their operation, may be made by those skilled in the art without departing from the spirit or scope of the invention. Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for creating a balanced annular flow in an extrusion die containing a deflector system which is comprised of multiple bowtie sub deflectors that are offset from one another, wherein inputs into the multiple bowtie sub deflectors are a stream of material or a stream of layers, and annular outputs of the bowtie sub deflectors are merged to create the balanced annular flow.

2. The method according to claim 1, wherein the extrusion distance to balanced annular flow is improved by the multiple bowtie sub deflectors such that flow rate imbalances from a first bowtie sub deflector will align with opposite imbalances from a second bowtie sub deflector.

3. The method according to claim 1, wherein a seam formed where material meets to complete an annular flow in a given bowtie sub deflector is at an angle offset from a seam formed where material meets to form an annular flow in a second bowtie sub deflector.

4. The method according to claim 1, wherein the multiple bowtie sub deflectors include a distribution groove with a balanced flow passage dispersing molten plastic in an extrusion die evenly within a tubular or profile extrusion channel.

5. The method according to claim 3, wherein the balanced annular flow is extruded as a medical tube.

6. The method according to claim 3, wherein the balanced annular flow is extruded as an irrigation tube.

\* \* \* \* \*